Dec. 29, 1964   L. A. CULVER   3,162,883
UNATTENDED AUTOMOBILE WASHING AND CLEANING APPARATUS
Filed Oct. 1, 1962   3 Sheets-Sheet 1
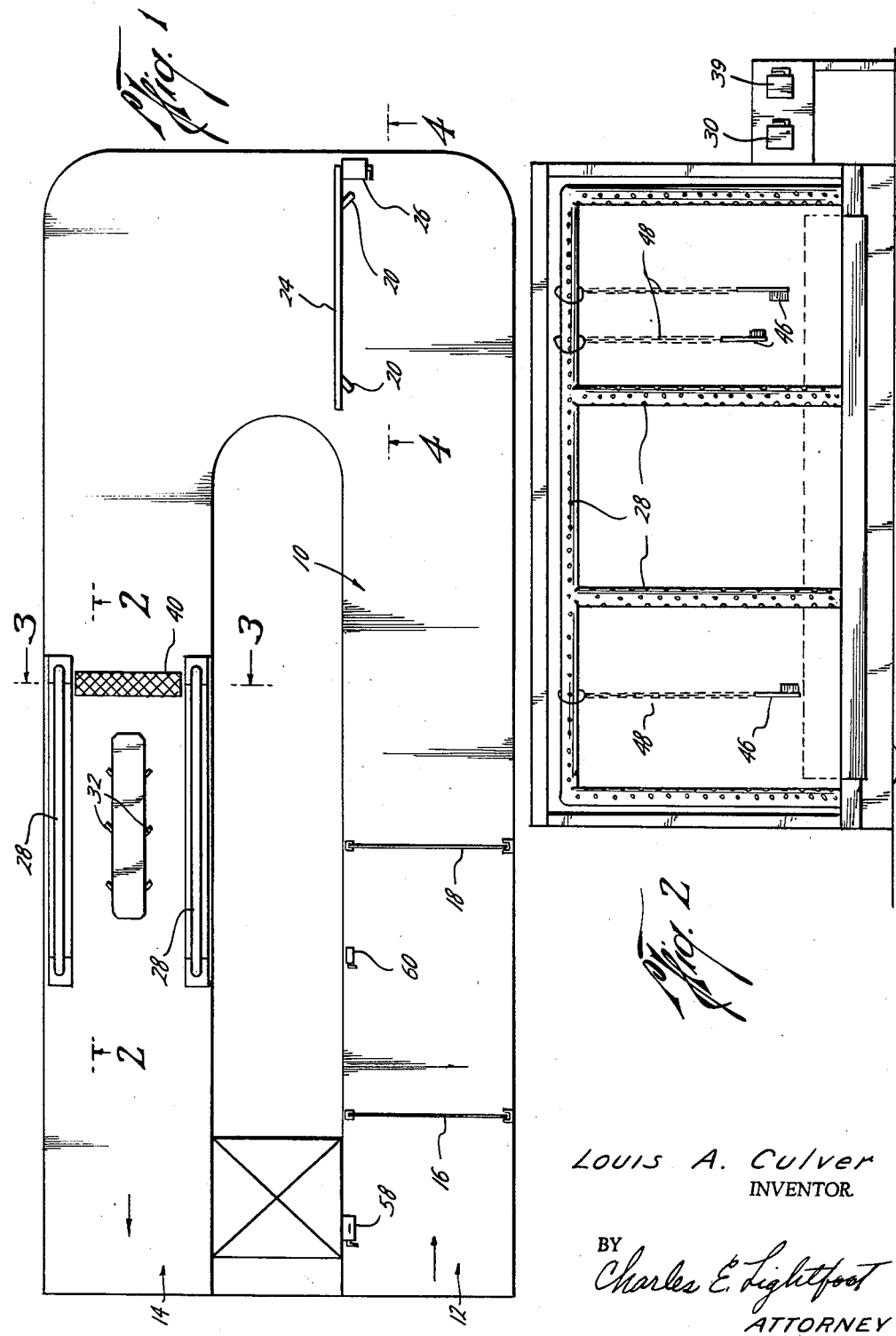
Louis A. Culver
INVENTOR
BY Charles E. Lightfoot
ATTORNEY

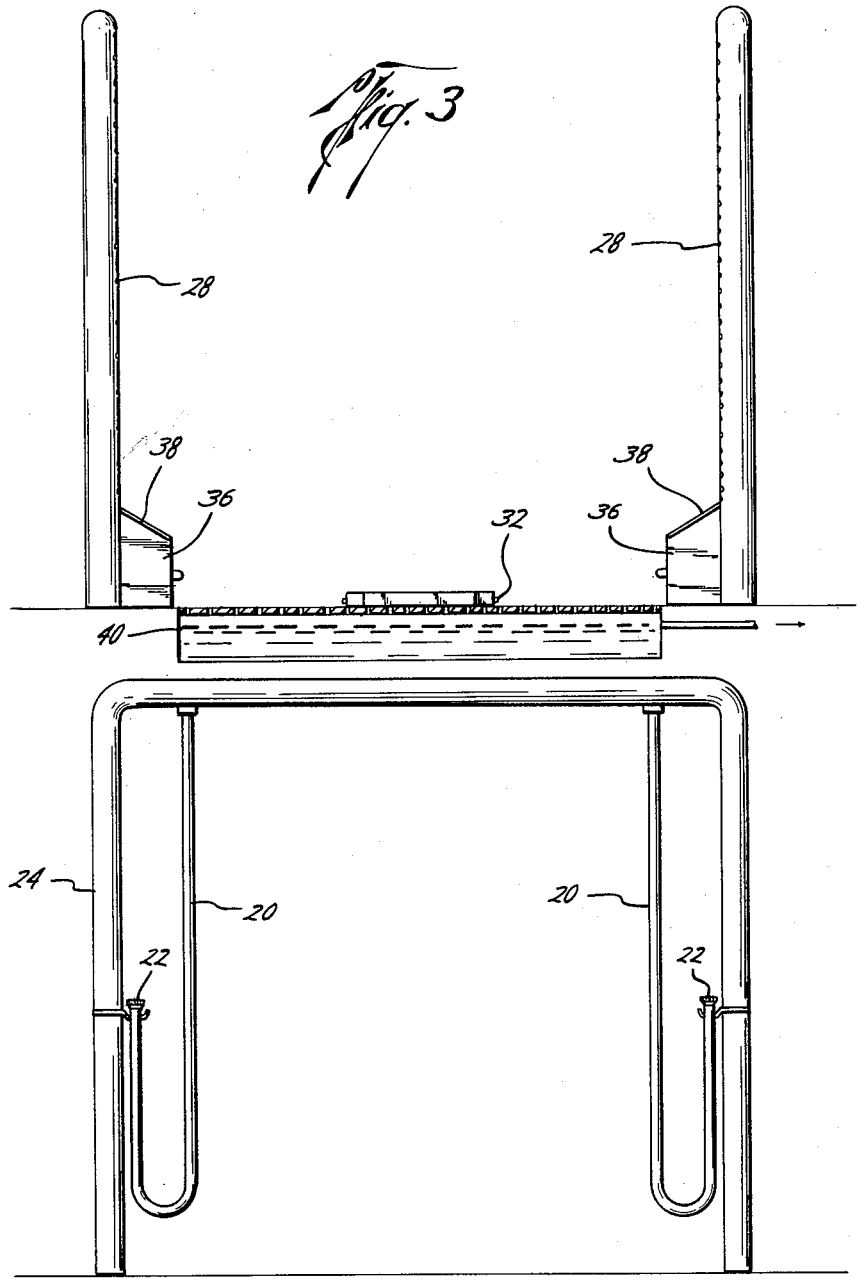

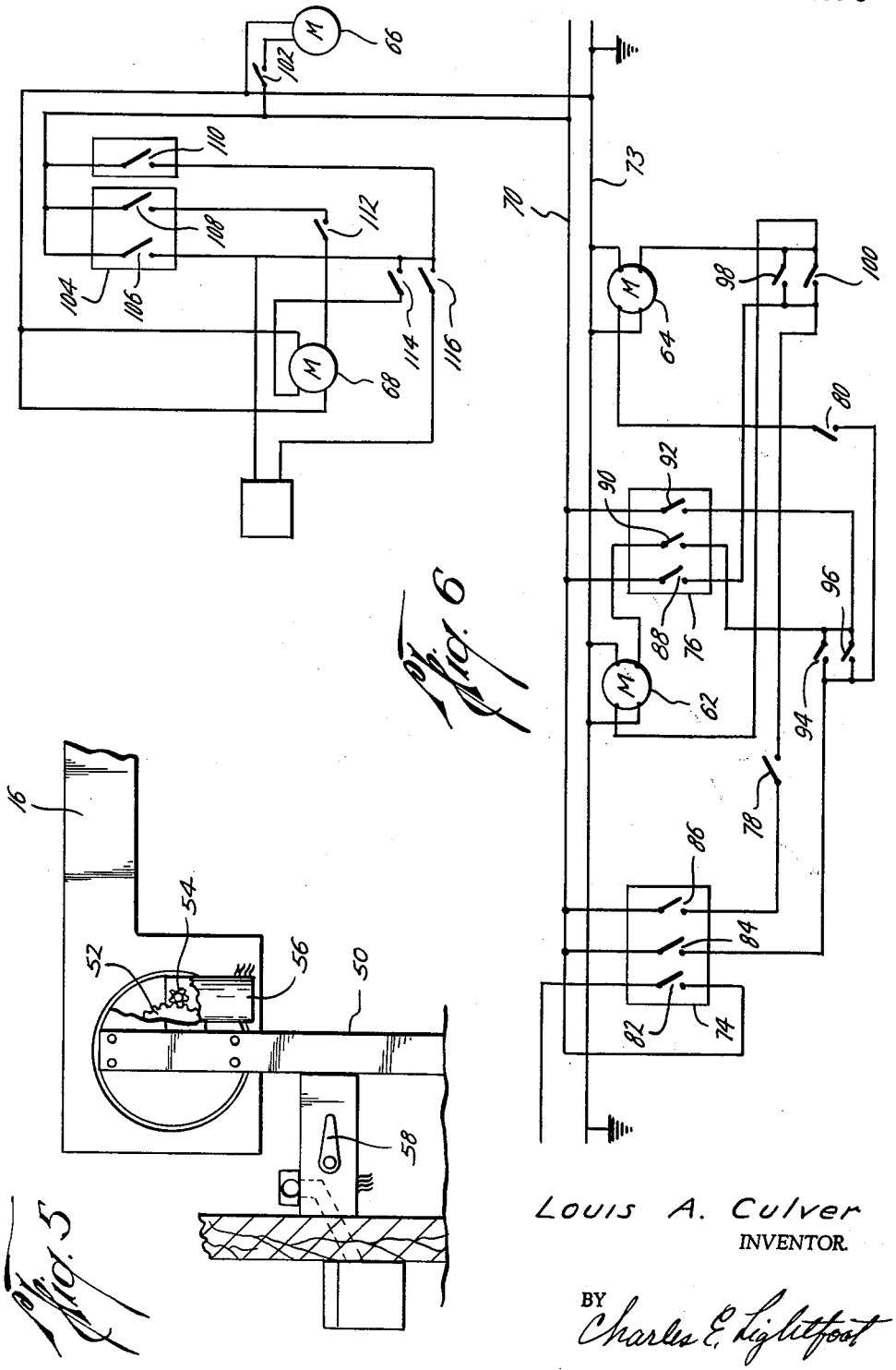

United States Patent Office 3,162,883
Patented Dec. 29, 1964

3,162,883
UNATTENDED AUTOMOBILE WASHING AND CLEANING APPARATUS
Louis A. Culver, 1119 W. 26th St., Houston, Tex.
Filed Oct. 1, 1962, Ser. No. 227,443
1 Claim. (Cl. 15—302)

This invention relates to equipment for washing and cleaning automobiles, and more particularly to an unattended auto laundry or car washing and cleaning station designed to be used by the operators of automobiles in the washing, cleaning and polishing of such vehicles.

The invention has for an important object the provision of an automobile washing and cleaning station embodying a variety of cleaning equipment arranged to be used by the operator of an automobile in the washing, cleaning and polishing of the vehicle.

Another object of the invention is to provide an automobile cleaning station in which the cleaning equipment is maintained in constant readiness for use without the need of attendants.

A further object of the invention is the provision of an automobile washing and cleaning station having a continuous route or pathway along which various cleaning equipment is arranged for the carrying out of cleaning, washing and polishing operations and also having means for controlling the admission of one vehicle at a time to the station.

Another object of the invention is to provide an automobile washing and cleaning station in which the various equipment is electrically operated and in which means is provided for turning off the current when the equipment is out of use.

A further object of the invention is the provision in an automobile washing and cleaning station of gate means for controlling the admission of automobiles to the station which is coin operated and by which only one vehicle at a time is admitted to the station.

Another object of the invention is to provide unattended automobile washing equipment which is economical in operation and which is easily maintained.

The above and other important objects and advantages of the invention may best be understood from the following detailed description constituting a specification of the same, when considered in conjunction with the annexed drawings, wherein—

FIGURE 1 is a top plan view of a preferred embodiment of the automobile washing and cleaning station of the invention;

FIGURE 2 is a fragmentary side elevational view on an enlarged scale showing a portion of the washing equipment of the station;

FIGURE 3 is a cross-sectional view, on an enlarged scale, taken along the line 3—3 of FIGURE 1, looking in the direction indicated by the arrows;

FIGURE 4 is an end elevational view, on an enlarged scale, showing vacuum cleaner apparatus embodied in the cleaning station of the invention;

FIGURE 5 is a fragmentary side elevational view, on a greatly enlarged scale, showing details of one of the entrance gate structures and its operating mechanism; and FIGURE 6 is an electrical diagram of the electrical circuits through which the various equipment of the cleaning station is operated.

The washing and cleaning station of the invention, is designed to be installed at any convenient location, such as on a city lot to which access may be had by one or more streets, the location being suitably fenced, or otherwise enclosed to prevent unauthorized use of the premises.

Referring now to the drawings in greater detail the washing and cleaning installation or station of the invention includes a driveway, generally designated 10 in FIGURE 1, preferably of generally U-shape to provide an entranceway 12 through which an automobile may enter the station and an exit 14 by which the automobile may leave.

Access to the driveway is controlled by first and second entrance gates 16 and 18, respectively, which are located in longitudinally spaced relation in the entrance portion of the driveway and which when closed traverse the driveway. The gates 16 and 18 are preferably of a type mounted to be raised vertically by rotation about a horizontal axis at one end of the gate by means of a suitable electrical motor and gear mechanism, such as that illustrated in FIGURE 5. The gates 16 and 18 are arranged to be operated in sequence, as by first opening the gate 16 to allow a vehicle to be driven into the driveway as far as the gate 18, whereupon the gate 16 is closed and the gate 18 then opened, whereby each vehicle must separately enter the driveway. The gates are preferably controlled by coin actuated mechanism, whereby each user must pay in advance before the gates may be operated to allow the vehicle to enter the premises.

Within the enclosure whose entrance is thus controlled, the cleaning and washing equipment is arranged along the driveway at convenient intervals for use by the customer in washing and cleaning the vehicle. The cleaning and washing equipment, as well as suitable electric lights for use at night are connected into electrical circuits which are supplied by current from a common source under the control of the coin actuated mechanism, whereby the current is turned on when a customer enters the station and is turned off after a predetermined time, so that the equipment will not be in operation except when being used.

The cleaning and washing equipment my include suction cleaning apparatus, such as that shown in FIGURE 4, comprising suction hoses 20, provided with nozzles 22 which may have brushes or other devices attached thereto for use in cleaning the interior of the vehicle, one such hose being positioned for convenient use on each side of the vehicle. The hoses 20 are connected to a tubular frame 24 of generally inverted U-shape positioned over the driveway and into which the vehicle may be moved when the interior of the vehicle is to be cleaned. The frame 24 is connected to a suitable source of suction, not shown, whereby the suction hoses may be operated in the usual manner. The operation of the suction hoses is preferably under the control of an electric switch 26, shown in FIGURE 1, so that the suction may be turned on and off as desired.

The equipment includes washing apparatus of the kind shown in FIGURES 1, 2 and 3, which is located to permit the vehicle to be driven along the driveway to be washed thereby.

The washing apparatus comprises water spraying pipes 28 in the form of generally rectangular frames erected in parallel relation on each side of the driveway in position to direct sprays of water against the vehicle when the same is moved into position between the frames. The spraying apparatus is connected to a suitable source of water under pressure, not shown and is under the control of an electric switch, such as that indicated at 30 in FIGURE 2 whereby the spray may be turned on and off when desired. The spray apparatus may also include centrally located, laterally directed, spray nozzles 32 arranged close to ground level and positioned to direct sprays of water against the inner faces of the wheels or against other locations beneath the vehicle for cleaning the same.

Detergent receptacles, such as those indicated at 36 in FIGURE 3 are provided, which extend along the length of the washing apparatus and may be provided with hinged covers 38 which are adapted to be electrically operated, as by a motor 39, whereby the covers are opened and closed automatically. By this means liquid detergent may be provided for use in washing the vehicle and the containers will be closed when not in use to prevent evaporation or other waste of the detergent.

Drain means, such as that indicated at 40 is provided at a suitable location between the spray pipes, which means has a perforated cover or grate 42 and a discharge pipe 44 through which waste water may be conducted away from the apparatus.

Various cleaning implements, such as brushes 46, and the like, are suspended on chains 48, or the like, from the spray pipe frames at suitable intervals on each side of the apparatus for convenient use in scrubbing the vehicles when desired.

After the vehicle has passed through the cleaning and washing apparatus, the vehicle is driven away through the exit end of the driveway.

The supporting and operating mechanism for the gates is shown in detail in FIGURE 5, wherein the gate 16 is shown mounted at one end on an upright support 50 for vertical swinging movement. The gate is connected to a large gear 52 which meshes with a small gear 54 adapted to be operated by a reversible electric motor 56 by which the gate is raised and lowered. The gates are operated under the control of electric switches 58 and 60, the switch 58 being coin actuated to place the same initially in condition for operation.

The electrical circuits by which the various components of the equipment are operated are illustrated in FIGURE 6. In the circuit diagram the motor for operating the gate 16 is designated 62, and the motor for operating gate 18 is designated 64, while the motor for operating the water spray is designated 66 and the motor by which the covers 38 of the detergent containers 36 are operated is designated 68. The main current supply conductors of the electrical system are shown at 70 and 72, and the electric lighting system of the station is also connected to these conductors.

The electric circuit of the motor 62 is controlled by main switch mechanism 74, and the circuit of the motor 64 is controlled by main switch mechanism 76. An up-stop switch 78 is installed in the circuit of motor 62 at a position to open the circuit when the gate 16 reaches its open position. An up-stop switch 80 is also provided for stopping the motor 64 when the gate 18 reaches its open position.

Main switch mechanism 74 comprises a plurality of switches 82, 84 and 86, of which the switch 82 is a time actuated switch for shutting off the current from the entire system after a predetermined time subsequent to closing of the switch, the switch 84 being a switch in the reversing circuit of the motor 62, and the switch 86 being located in the forward or up circuit of motor 62.

The main switch mechanism 76 comprises switches 88, 90 and 92, of which the switch 88 is in the reversing circuit of motor 64, while switch 90 is in the reversing circuit of motor 62, and switch 92 is in the forward or up circuit of motor 64.

The reversing circuit of motor 62 also has in it a down-stop switch 94 positioned to be opened to stop the motor when the gate 16 reaches down position, and a switch 96 is connected into the forward or up circuit of motor 64 so that gate 18 will not open until gate 16 has been closed.

Similarly the reversing circuit of motor 64 has a down-stop switch 98 which opens to stop the motor when gate 18 reaches down position, and a switch 100 is included in the forward or up circuit of motor 62 which prevents the gate 16 from being opened unless gate 18 is closed.

The circuit of motor 66 by which the suction cleaning apparatus is operated has a switch 102 which may be closed to start the motor and which is timed to open after a pre-determined period to shut off the motor.

The operation of the washing apparatus is controlled by a main switch mechanism 104, having three switches 106, 108 and 110, of which the switch 106 is in the reversing circuit of motor 68 by which the covers 38 are closed, while switch 108 is in the forward or up circuit of motor 68 by which the covers 38 are raised, and switch 110 is in a circuit by which a valve 111 is opened and closed whereby the water supply is turned on and off. The cover operating motor 68 has in its circuit a switch 112 which is positioned to be opened to stop the motor when the covers 38 reach open positions, and a switch 114 which is positioned to be opened to stop the motor when the covers reach closed positions. A time switch 116 is provided in the circuit of motor 68 by which the motor is operated to close the covers 38 after a pre-determined time after the covers have been opened, so that the covers will not be accidentally left in their open positions when the station is shut down.

In operating the apparatus of the invention, the customer deposits the proper amount in coin in the coin actuated switch mechanism to place the switch mechanism 58 in condition to be operated, whereupon the switch mechanism may be closed to cause the gate 18 to open to allow the customer to drive his vehicle through the entrance along the driveway up to the gate 18. When the switch mechanism 58 is closed the power will be supplied to conductors 70 and 72 to furnish current to the lights, gate mechanism, and cleaning and washing mechanism. The switch mechanism 58 is, however, timed to open after a predetermined time, such as thirty minutes, so that the lights and other apparatus will not be operated continuously when the station is not in use.

Upon closing of the switch mechanism 58, switch 82 will be closed to supply power to the entire system. Switch 84 will be closed to supply power for the closing of gate 16 upon closing of switch mechanism 76. Switch 86 will also be closed to furnish current to motor 62 whereby gate 16 will immediately open.

When gate 16 reaches open position the up-stop switch 78 will be opened to stop the gate motor 62. After the vehicle has passed through gate 16 the customer will close switch mechanism 76 manually, whereupon switch 88 will be closed to furnish power for the closing of gate 16 after the same has been opened, switch 90 will be closed to furnish power for the closing of gate 16, which will immediately close, and switch 92 will be closed to furnish power to motor 64 to immediately open gate 18. When gate 18 reaches open position up-stop switch 80 will be opened to stop motor 64 and switch 100 will be closed to supply power for the reopening of gate 16 when the switch mechanism 74 is operated by the next customer. When gate 18 reaches closed position switch 98 will be opened to stop the motor 64.

It will be apparent that by this arrangement of circuits and switches, the gate 16 will not open unless gate 18 is closed and gate 18 cannot be opened until gate 16 has been closed, thus preventing more than one vehicle at a time from passing through the gates to enter the station.

When a vehicle has entered the driveway through gates 16 and 18, the vehicle may be driven to the location of the vacuum cleaning equipment, where the switch 102 may be closed to place the equipment in operation. The time switch 102 may, of course, be repeatedly closed to give more time for cleaning the vehicle if required.

From the vacuum cleaning equipment the vehicle is driven into the washing equipment, whereupon the switch mechanism 104 may be closed to operate the washing equipment. In the switch mechanism 104, the switch 110 is operable independently of the switches 106 and 108, which operate together. Upon closing of switch 108 the motor 68 will be operated to open the covers 38 of detergent containers 36, switch 112 being opened to stop the motor when the covers reach open position. The closing of switch 106 will supply power to the reversing circuit of motor 68. When the covers 38 reach closed position switch 114 will be opened to stop the reverse operation of motor 68. Switch 110 is closed to operate the water valve 111 to supply water to the sprays. The switch mechanism 104 is preferably timed to shut off the water and close the covers 38 after a predetermined time interval, so that the water will not be wasted or the detergent evaporated when the station is not being used.

The exit end of the driveway may, of course, be controlled by suitable gate mechanism, not shown, through which vehicles may leave the station but not enter the same.

It will thus be seen that the invention provides a vehicle cleaning and washing station which may be unattended and which is placed in operation for limited periods of time by the customers who make use of the station.

The invention is disclosed herein in connection with a particular arrangement and method of operation of the equipment, but it will be understood that this is intended by way of illustration only, and that the apparatus is capable of various modifications within the spirit of the invention and the scope of the appended claim.

Having thus clearly shown and described the invention what is new and desired to secure by Letters Patent is:

In an automobile cleaning station a driveway along which an automobile may be driven, a first gate for opening and closing one end of the driveway, a second gate for opening and closing the driveway at a location spaced longitudinally from the first gate, a main electrical circuit, electrically operable cleaning equipment located at separate locations along the driveway and connected into said main circuit, electrical means for opening and closing each gate, an opening and closing circuit for each electrical means connected into said main circuit, means for closing each of said opening and closing circuits, means for closing the main circuit upon closing of the opening circuit of said first gate, means for opening the main circuit when the main circuit has been closed for a predetermined time and means for maintaining the opening circuit of said second gate in an open condition when said first gate is out of closed position.

References Cited in the file of this patent
UNITED STATES PATENTS

| | | |
|---|---|---|
| 1,866,197 | Cunningham | July 5, 1932 |
| 2,795,875 | Nutter | June 18, 1957 |
| 2,874,819 | Nutter | Feb. 24, 1959 |